(12) United States Patent
Iwaki et al.

(10) Patent No.: US 12,736,320 B2
(45) Date of Patent: Sep. 15, 2026

(54) GROOVE SHAPE MEASURING METHOD AND GROOVE SHAPE MEASURING APPARATUS

(71) Applicant: Tokyo Seimitsu Co., Ltd., Tokyo (JP)

(72) Inventors: Satoru Iwaki, Tokyo (JP); Tasuku Shimizu, Tokyo (JP)

(73) Assignee: TOKYO SEIMITSU CO., LTD., Tokyo (JP)

(*) Notice: Subject to any disclaimer, the term of this patent is extended or adjusted under 35 U.S.C. 154(b) by 53 days.

(21) Appl. No.: 18/622,292

(22) Filed: Mar. 29, 2024

(65) Prior Publication Data

US 2024/0328769 A1 Oct. 3, 2024

(30) Foreign Application Priority Data

Mar. 30, 2023 (JP) ................................ 2023-056514

(51) Int. Cl.

| | |
|---|---|
| ***G01B 5/008*** | (2006.01) |
| ***B23K 26/03*** | (2006.01) |
| ***G01B 11/00*** | (2006.01) |

(52) U.S. Cl.

CPC ............ *G01B 5/008* (2013.01); *B23K 26/032* (2013.01); *G01B 11/005* (2013.01)

(58) Field of Classification Search

CPC ...... G01B 5/008; G01B 11/005; G01B 11/24; B23K 26/032; B23K 26/364; H01L 22/12

See application file for complete search history.

(56) References Cited

U.S. PATENT DOCUMENTS

2011/0100966 A1* 5/2011 Nagatomo ........... B23K 26/359 219/121.72

FOREIGN PATENT DOCUMENTS

JP 2015-85397 A 5/2015

* cited by examiner

*Primary Examiner* — Monica T Taba

(74) *Attorney, Agent, or Firm* — Birch, Stewart, Kolasch & Birch, LLP

(57) ABSTRACT

The present disclosure provides a groove shape measuring method and a groove shape measuring apparatus, capable of achieving reduction in processing load and acquisition of a more accurate cross-sectional profile. The groove shape measuring method includes: a setting step of dividing a processing groove into a plurality of measurement regions with a predetermined pitch and further setting, for each of the measurement regions, N number of sub-measurement regions in the measurement region; a coordinate data acquisition step of acquiring a plurality of coordinate data on the processing groove in respective M-th sub-measurement regions in the measurement regions; and a cross-sectional profile generation step of generating a cross-sectional profile by projecting the coordinate data, corresponding to the M-th sub-measurement regions acquired for the respective measurement regions in the coordinate data acquisition step, onto a two-dimensional plane.

6 Claims, 15 Drawing Sheets

10
18
CONTROL DEVICE
16
PROCESSING HEAD
20
LASER OPTICAL SYSTEM
22
ALIGNMENT MICROSCOPE
24
WHITE INTERFERENCE MICROSCOPE
14
STAGE DRIVE UNIT
L
W
12
X
Y
Z
θ

4A
4B
50
52
THREE-DIMENSIONAL
COORDINATE DATA GROUP
Z
Y
X
W
9
54
Z
Y
X

RELATED ART

RELATED ART

RELATED ART

RELATED ART

GROOVE SHAPE MEASURING METHOD AND GROOVE SHAPE MEASURING APPARATUS

CROSS-REFERENCE TO RELATED APPLICATION

The present application claims priority under 35 U.S.C § 119(a) to Japanese Patent Application No. 2023-056514 filed on Mar. 30, 2023, which is hereby expressly incorporated by reference, in its entirety, into the present application.

BACKGROUND OF THE INVENTION

Field of the Invention

The present disclosure relates to a groove shape measuring method and a groove shape measuring apparatus that measure a cross-sectional profile of a processing groove formed on an object to be processed (workpiece) by a processing apparatus.

Description of the Related Art

On workpieces such as semiconductor wafers, a plurality of devices are partitioned to have a lattice pattern (grid pattern) along lattice-shaped (grid-shaped) streets. A laser processing apparatus is known to perform laser processing (also referred to as ablation groove processing) which irradiates such workpieces with pulse laser light from a laser optical system while the laser optical system is relatively moved in a processing feed direction along streets, so as to form processing grooves along the streets (see Japanese Patent Application Laid-Open No. 2015-085397). The laser processing apparatus measures a cross-sectional profile of a processing groove (also referred to as a kerf) in order to determine the processing quality of the processing groove, detect debris and detect an amount of displacement of the processing position of the processing groove.

For example, the laser processing apparatus described in Japanese Patent Application Laid-Open No. 2015-085397 repeatedly captures XY plane images of a processing groove that is formed in an X direction (processing feed direction) while moving a confocal microscope in a Z direction, and then stacks each of the XY plane images in the Z direction to construct three-dimensional data (also called a three-dimensional model) of the processing groove. The laser processing apparatus described in Japanese Patent Application Laid-Open No. 2015-085397 measures three-dimensional coordinate data representing the shape of the processing groove using a white interference microscope or a laser displacement meter, and constructs three-dimensional data of the processing groove based on the three-dimensional coordinate data. The laser processing apparatus in Japanese Patent Application Laid-Open No. 2015-085397 cuts out a certain cross section from the three-dimensional data of the processing groove to compute the cross-sectional profile of the processing groove.

Prior Art Document

Patent Literature 1: Japanese Patent Application Laid-Open No. 2015-085397

SUMMARY OF THE INVENTION

Incidentally, the laser processing apparatus described in Japanese Patent Application Laid-Open No. 2015-085397 needs to construct the three-dimensional data of the processing groove. This increases the processing load of a control device, such as a personal computer (PC), of the laser processing apparatus that performs the construction processing.

To reduce the processing load, in one method to obtain the cross-sectional profile, data on a certain cross section of the processing groove is extracted from acquired data on the processing groove, and processing is performed only for the extracted data, without constructing three-dimensional data from the acquired data on the processing groove. By using this method, the cross-sectional profile can be obtained with a minimum data processing amount.

FIG. 12 is an explanatory diagram showing a processing groove 9 after laser processing using pulse laser light as viewed from a top of a workpiece W, for describing an issue in the related art. In the processing groove 9 in FIG. 12, black circles and white circles indicate chipping, debris, or the like. FIG. 13 is a graph showing a cross-sectional profile 100A of the processing groove 9 in a region 100 in FIG. 12 and a cross-sectional profile 102A of the processing groove 9 in a region 102.

As shown in FIG. 12, chipping, debris, and the like are generated on the workpiece after laser processing. In laser processing using pulse laser light, there is a slight variation in irradiation energy and irradiation time of each pulse. Due to the influence of the variation, the shape in the processing groove 9 may change as shown in FIG. 13 (see the cross-sectional profile 100A in FIG. 13).

FIG. 14 is an explanatory diagram showing the processing groove 9 after laser processing using pulse laser light as viewed from the top of the workpiece W, for describing an issue in the related art. FIG. 15 is a graph showing a cross-sectional profile 200A of the processing groove 9 in a stereoscopic region 200 in FIG. 14.

As shown in FIG. 14, another method for reducing the processing load is to obtain the cross-sectional profile 200A as shown in FIG. 15 by extracting cross-sectional data of the prescribed stereoscopic region 200 in the processing groove 9 and calculating average cross-sectional data using a statistical technique. When this method is used, it may be possible to remove the shape change with the statistical technique.

However, in laser processing using pulse laser light, the processing groove 9 is formed by repeating irradiation with the pulse laser light along the street, which may appear a periodic shape in the processing groove 9. Accordingly, the cross-sectional profile 200A, obtained by extracting the cross-sectional data of the prescribed stereoscopic region 200 and using the statistical technique, is an averaged profile of the prescribed stereoscopic region 200. Hence, such a statistical technique makes it difficult to obtain the cross-sectional profile of the processing groove 9 which is formed by the pulse laser light of a specific frequency. Such a statistical technique also makes it difficult to obtain the cross-sectional profile of the processing groove 9 formed by the pulse laser light of typical frequencies. When the cross-sectional profile is acquired using the statistical technique, the accuracy of the cross-sectional profile may decrease (see the cross-sectional profile 200A in FIG. 15).

The presently disclosed invention has been made in consideration of such circumstances, and aims to provide a groove shape measuring method and a groove shape measuring apparatus, capable of achieving reduction in processing load and acquisition of a more accurate cross-sectional profile.

In order to accomplish the object of the present disclosure, a groove shape measuring method for measuring a shape of a processing groove formed on a workpiece by a processing apparatus, includes: a setting step of dividing the processing groove into measurement regions with a predetermined pitch along a longitudinal direction of the processing groove and further setting N number of sub-measurement regions along the longitudinal direction in each of the measurement regions, wherein N is a natural number of two or more; a coordinate data acquisition step of acquiring coordinate data representing the shape of the processing groove in M-th sub-measurement regions in the respective measurement regions, wherein M is any natural number from 1 to N; and a cross-sectional profile generation step of generating a cross-sectional profile of the processing groove by projecting coordinate data corresponding to the M-th sub-measurement regions acquired in the coordinate data acquisition step, onto a two-dimensional plane.

According to the groove shape measurement method, it is possible to acquire a more accurate cross-sectional profile while reducing the processing load as compared with the case of generating a three-dimensional image using three-dimensional data of the processing groove (see the cross-sectional profile 100A in FIG. 13).

In the groove shape measuring method according to another aspect of the present disclosure, in the setting step, an interval between the M-th sub-measurement regions in the respective measurement regions is set to the pitch. This makes it possible to acquire a highly accurate cross-sectional profile formed by pulse laser light under specific conditions.

In the groove shape measuring method according to another aspect of the present disclosure, in the setting step, the cross-sectional profile may be obtained by using the interval between the M-th sub-measurement regions in the respective N measurement regions. In this way, non-periodic shape differences due to variation in each pulse of the pulse laser light are averaged.

In the groove shape measuring method according to another aspect of the present disclosure, in a case where the processing groove is formed by pulse laser light emitted to the workpiece, from the processing apparatus that is moved relatively to the workpiece at predetermined processing feed speed, in the setting step, the pitch is set according to P=v/f (mm) or an integer multiple of v/f (mm), wherein v (mm/sec) represents the processing feed speed, f (Hz) represents frequency of the pulse laser light and P represents the pitch. This prevents the periodic shape in the longitudinal direction of the processing groove from being averaged when the cross-sectional profile of the processing groove is measured.

The groove shape measuring method according to another aspect of the present disclosure may further include a coordinate data measurement step of measuring the coordinate data on the processing groove, and in the coordinate data acquisition step, the coordinate data corresponding to the M-th sub-measurement regions in the respective measurement regions are acquired from the coordinate data previously measured in the coordinate data acquisition step.

In the groove shape measuring method according to another aspect of the present disclosure, in the cross-sectional profile generation step, the coordinate data corresponding to the M-th sub-measurement regions are projected onto the two-dimensional plane perpendicular to the longitudinal direction.

In order to accomplish the object of the present disclosure, a groove shape measuring apparatus that measures a shape of a processing groove formed on a workpiece by a processing apparatus includes: a setting unit configured to divide the processing groove into measurement regions with a predetermined pitch along a longitudinal direction of the processing groove, and further sets N number of sub-measurement regions in each of the measurement regions along the longitudinal direction, wherein N is a natural number of two or more; a coordinate data acquisition configured to acquire coordinate data representing the shape of the processing groove in M-th sub-measurement regions in the respective measurement regions, wherein M is any natural number from 1 to N; and a cross-sectional profile generation unit configured to generate a cross-sectional profile of the processing groove by projecting the coordinate data corresponding to the M-th sub-measurement regions acquired for the respective measurement regions by the coordinate data acquisition unit, onto a two-dimensional plane.

The groove shape measuring apparatus according to another aspect of the present disclosure, in a case where the processing groove is formed by pulse laser light emitted from the processing apparatus that is moved relatively to the workpiece at predetermined processing feed speed, the setting unit sets the pitch to P=v/f (mm) or an integer multiple of v/f (mm), wherein v (mm/sec) represents the processing feed speed, f (Hz) represents frequency of the pulse laser light, and P represents the pitch.

The presently disclosed invention may achieve reduction in processing load and acquisition of a more accurate cross-section profile.

DESCRIPTION OF THE PREFERRED EMBODIMENTS

[Configuration of Laser Processing Apparatus]

Figure 1:
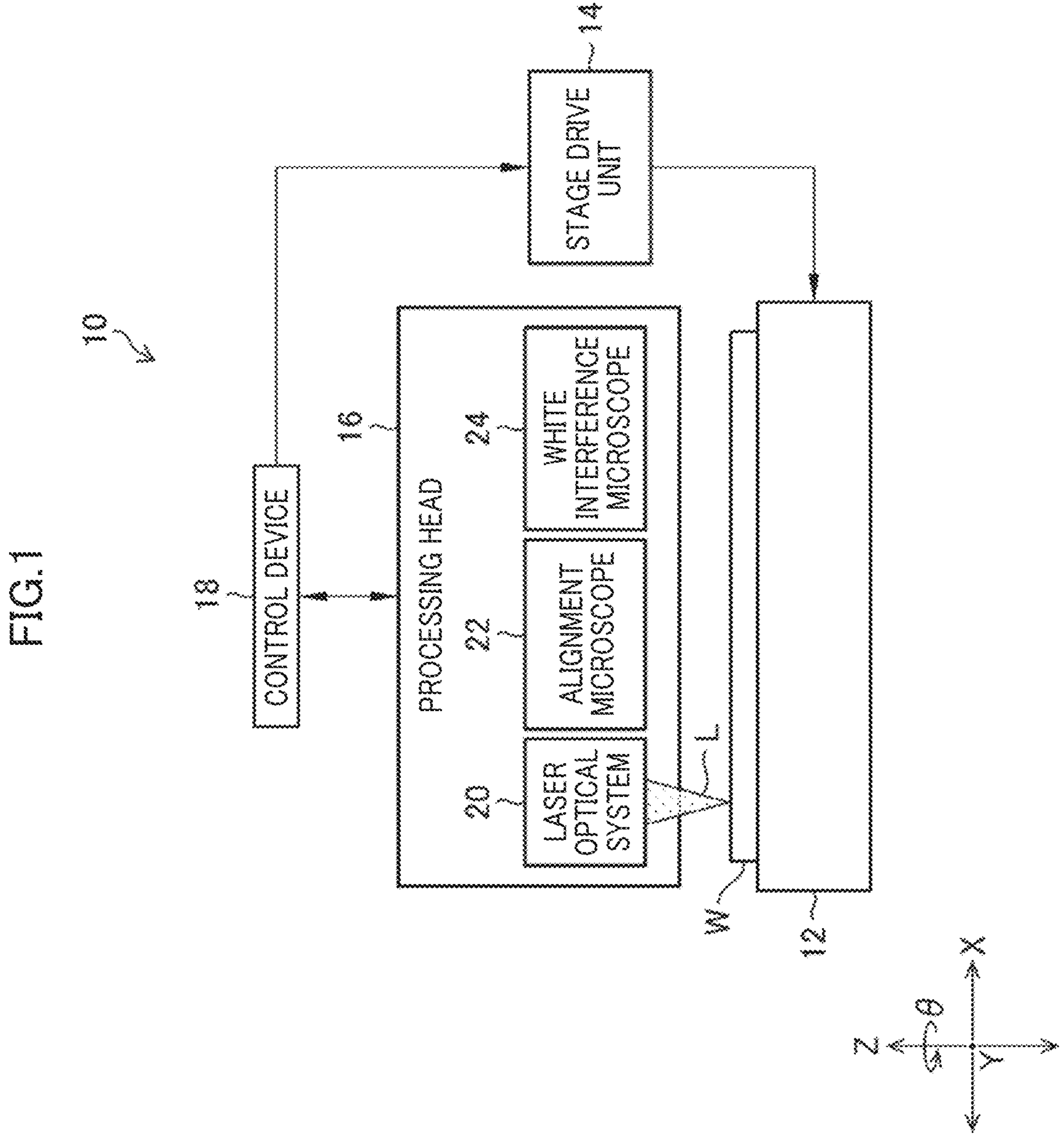
FIG. 1 is a block diagram of a laser processing apparatus.

FIG. 1 is a block diagram of a laser processing apparatus 10 corresponding to the processing apparatus of the present disclosure. In drawings, XYZ directions are perpendicular to each other, the X and Y directions are horizontal directions, and the Z direction is a vertical direction (perpendicular direction) (a thickness direction of a workpiece W). A θ direction is a rotation direction with the Z direction as a rotation axis.

Figure 2:
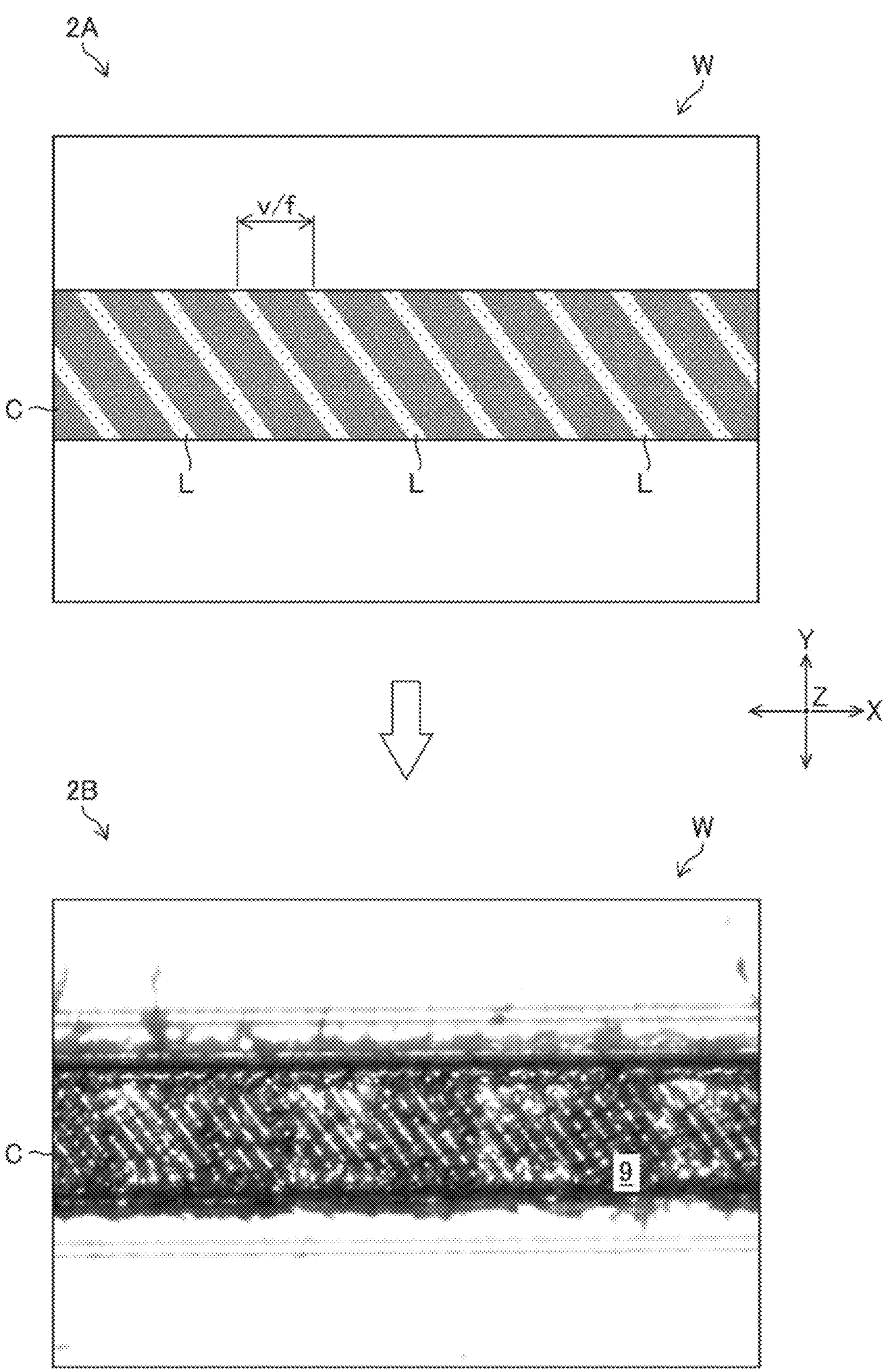
FIG. 2 is an explanatory diagram for describing laser processing by a laser optical system.

As shown in FIG. 1, as a pre-process of a dividing process in which a workpiece W (corresponding to the workpiece of the present invention) such as a semiconductor wafer, are divided into chips, the laser processing apparatus 10 performs laser processing to form a processing groove 9 along streets C on the workpiece W as shown in FIG. 2 described later. The laser processing apparatus 10 also has a function to measure a cross-sectional profile 54 (see FIG. 8), which represents the cross-sectional shape of the processing groove 9 formed by laser processing. The laser processing apparatus 10 includes a suction stage 12, a stage drive unit 14, a processing head 16, and a control device 18.

The suction stage 12 sucks and holds the back side of the workpiece W that is opposite to the surface thereof. This allows the workpiece W to be held to the suction stage 12 so that the surface side of the workpiece W faces the processing head 16.

The stage drive unit 14 includes a motor drive mechanism and a publicly known actuator, such as a linear motor. The stage drive unit 14 moves the suction stage 12 in the XYZ directions and rotates the suction stage 12 in the θ direction. Thus, the processing head 16 may be moved relative to the workpiece W on the suction stage 12 in the XYZ and θ directions. The method of moving the processing head 16 relatively to the workpiece W in the XYZ and θ directions is not particularly limited, and the processing head 16 may be moved or both the suction stage 12 and the processing head 16 may be moved.

The processing head 16 is used for laser processing of the street C in the workpiece W (see FIG. 2). The processing head 16 is disposed at a position above the suction stage 12 in the Z direction (at the position facing the surface of the workpiece W). The processing head 16 includes a laser optical system 20, an alignment microscope 22, and a white interference microscope 24. Although the laser optical system 20, the alignment microscope 22, and the white interference microscope 24 are provided separately in the present embodiment, some or all of these components may be integrated. The alignment microscope 22 and the white interference microscope 24 may be provided separately from the processing head 16.

FIG. 2 is an explanatory diagram for describing laser processing by the laser optical system 20. As shown in FIG. 2 and FIG. 1 described above, the laser optical system 20 irradiates the street C of the workpiece W with pulse laser light L under the control of the control device 18 described later. Since a configuration of the laser optical system 20 and a type of the pulse laser light L are technologies known to the public, detailed description thereof is omitted here (see, for example, Japanese Patent Application Laid-Open No. 2015-085397 and Japanese Patent Application Laid-Open No. 2022-071402).

While the laser optical system 20 is irradiating the street C with the pulse laser light L with frequency of f (Hz), the stage drive unit 14 moves the suction stage 12 (workpiece W) in the X direction that is the processing feed direction, at processing feed speed [v (mm/sec)]. As a result, the pulse laser light L irradiated along the street C has a pulse pitch of v/f (mm) as shown by reference numeral 2A of FIG. 2. With irradiation of the pulse laser light L with a pulse pitch of v/f (mm), the processing groove 9 is formed along the street C as shown by reference numeral 2B of FIG. 2. When the processing groove 9 is formed by repeated irradiation of the pulse laser light L along the street C in this way, a periodic shape is repeatedly formed in an advance direction of the processing groove 9.

The alignment microscope 22 (including an illumination light source and a camera) performs imaging of an alignment reference (such as a pattern) formed on the workpiece W before laser processing of the workpiece W under the control of the control device 18 described later. Based on the image of the alignment reference captured by the alignment microscope 22 before laser processing, alignment of the laser optical system 20 with respect to the workpiece W is performed.

The white interference microscope 24 is, for example, a publicly known Mirau-type white light interferometer or a Michelson-type white light interferometer. The white interference microscope 24 is held movably in the Z direction by an unillustrated Z carriage. The white interference microscope 24 is used to measure three-dimensional coordinate data 50 (also referred to as a three-dimensional data group or point group data, see FIG. 4) which represents a shape (stereoscopic shape) of the processing groove 9. Instead of the white interference microscope 24, various microscopes may be used, such as a laser microscope (laser displacement meter) used for measuring the shape of various objects.

The control device 18 is a publicly known computing device, such as a PC, and integrally controls each unit of the laser processing apparatus 10. In laser processing of the workpiece W, the control device 18 controls alignment of the laser optical system 20 with respect to the street C of the workpiece W and laser processing of street C. In measurement of the cross-sectional profile 54 of the processing groove 9 (see FIG. 8), the control device 18 also controls measurement of the three-dimensional coordinate data 50 (see FIG. 4) and computation of the cross-sectional profile 54 of the processing groove 9.

[Function of Control Device]

Figure 3:
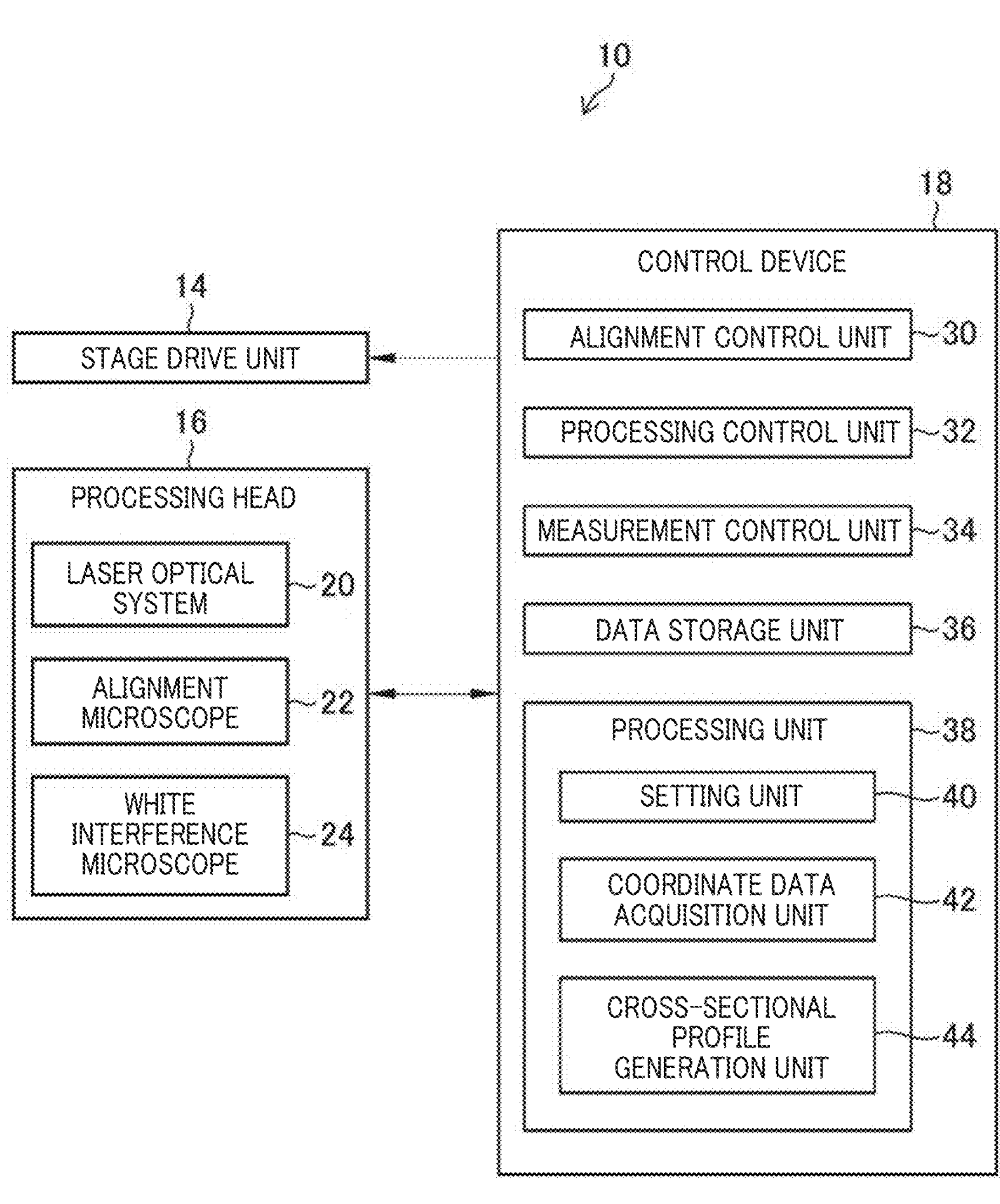
FIG. 3 is a functional block diagram of a control device.

FIG. 3 is a functional block diagram of the control device 18. As shown in FIG. 3, the control device 18 includes a computing circuit having various processors and memories, for example. Various processors include central processing units (CPUs), graphics processing units (GPUs), application specific integrated circuits (ASICs), and programmable logical devices, such as simple programmable logic devices (SPLDs), complex programmable logic devices (CPLDs), and field programmable gate arrays (FPGAs). The various functions of the control device 18 may be implemented by one processor, or may be implemented by processors of the same type or different types.

The control device 18 executes unillustrated control programs to function as an alignment control unit 30, a processing control unit 32, a measurement control unit 34, a data storage unit 36, and a processing unit 38.

The alignment control unit 30 controls alignment of the laser optical system 20 with respect to the street C of the workpiece W. The alignment control unit 30 firstly drives the stage drive unit 14 to adjust the position of the workpiece W so that the alignment reference of the workpiece W is included within an imaging range of the alignment microscope 22, and then performs imaging of the alignment reference using the alignment microscope 22. Next, the alignment control unit 30 detects relative position relationship between each street C and the laser optical system 20 in the XYZ directions by a publicly known method, based on the captured image of the alignment reference output from the alignment microscope 22. The alignment control unit 30 then drives the stage drive unit 14 to perform alignment to align an optical axis of the laser optical system 20 with the processing start position of each street C, based on the detection result of the relative position relationship.

The processing control unit 32 controls laser processing performed on each street C of the workpiece W by the laser optical system 20. After completion of the alignment, the processing control unit 32 forms the processing groove 9 along the street C by driving the stage drive unit 14 to move the workpiece W in the X direction while irradiating the street C with the pulse laser light L from the laser optical system 20. When laser processing for one street is completed, the control device 18 drives the stage drive unit 14 to align the optical axis of the laser optical system 20 with the processing starting position of the next street C, and then repeatedly performs irradiation of the pulse laser light L from the laser optical system 20 and movement of the workpiece W in the X direction by the stage drive unit 14. The control device 18 then performs laser processing on all the streets in a similar manner.

Figure 4:
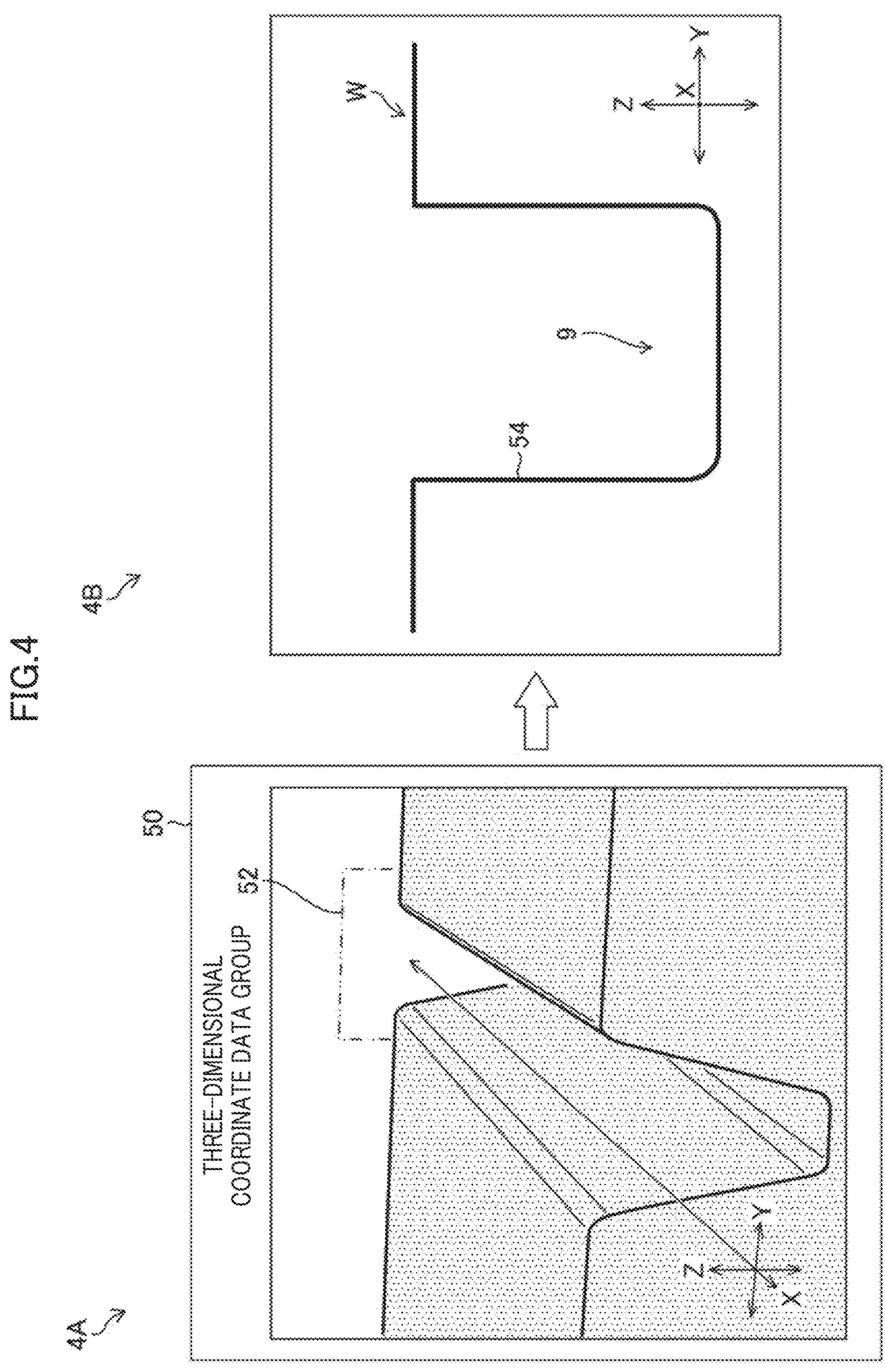
FIG. 4 is an explanatory diagram for describing an issue when a processing unit computes the cross-sectional profile of a processing groove.

In measurement of the cross-sectional profile 54 (see FIG. 8) of the processing groove 9 formed by the laser processing described above, the measurement control unit 34 controls shape measurement of the processing groove 9 using the white interference microscope 24, and more specifically, measurement of the three-dimensional coordinate data 50 on the processing groove 9 (see FIG. 4).

For example, the measurement control unit 34 drives the stage drive unit 14 to perform positional adjustment of the white interference microscope 24 with respect to the workpiece W so that the white interference microscope 24 is positioned above the processing groove 9 in the Z direction. Then, while causing the white interference microscope 24 to scan in the Z direction by controlling the unillustrated Z carriage, the measurement control unit 34 repeatedly performs irradiation of the processing groove 9 with white light using the white interference microscope 24 and imaging interference light (reflected light from the processing groove 9 and reference light from a reference plane) using a two-dimensional imaging element of the white interference microscope 24. When the range of shape measurement of the processing groove 9 is wider than a measurable range of the white interference microscope 24, the measurement control unit 34 changes the relative position of the white interference microscope 24 with respect to the workpiece W in the X direction, and then repeatedly performs scanning by the white interference microscope 24 in the Z direction described above, and irradiation of illumination light and imaging of the interference light by the white interference microscope 24.

Based on an imaging signal of the interference light output from the white interference microscope 24 and Z position information of the white interference microscope 24 output from the unillustrated Z carriage, the measurement control unit 34 acquires the three-dimensional coordinate data 50 (XYZ coordinate data, see FIG. 4) representing the coordinate data on each point of the shape of the processing groove 9 by a publicly known method.

The data storage unit 36 stores the three-dimensional coordinate data 50 (see FIG. 4) of the processing groove 9 acquired by the measurement control unit 34.

FIG. 4 is an explanatory diagram for describing an issue when the processing unit 38 computes a cross-sectional profile 54 of the processing groove 9. As shown in FIG. 4 and FIG. 3 described before, the processing unit 38 corresponds to the groove shape measuring apparatus of the present invention. The processing unit 38 generates the cross-sectional profile 54 of processing groove 9 based on the three-dimensional coordinate data 50 on the processing groove 9 stored in the data storage unit 36, without performing configuration processing of the three-dimensional image (three-dimensional model) of the processing groove 9.

In such generation processing of the cross-sectional profile 54, the three-dimensional coordinate data 50 on the processing groove 9, as shown in an image diagram of the three-dimensional data group designated by reference numeral 4A, is projected onto a virtual two-dimensional plane 52 (on a YZ plane) perpendicular to the X direction that is the longitudinal direction (or the advance direction) of the processing groove 9, so that the cross-sectional profile 54 of the processing groove 9 is generated as shown by reference numeral 4B. FIG. 4 shows a simplified illustration of the cross-sectional profile 54.

By projecting the three-dimensional coordinate data 50 onto the two-dimensional plane 52 in this way, the cross-sectional profile 54 of the processing groove 9 may be generated, without generating the three-dimensional data of the processing groove 9 as in conventional art.

In laser processing of the processing groove 9 using the pulse laser light L in this case, a periodic shape appears in the processing groove 9 in the advance direction by irradiation of the pulse laser light L with a pulse pitch of v/f (mm), as shown in FIG. 2. Accordingly, as shown in FIG. 4, in the cross-sectional profile 54 generated by projecting all the three-dimensional coordinate data 50 within the shape measurement range of the processing groove 9 onto the two-dimensional plane 52, the periodic shape of the processing groove 9 in the X direction is averaged. As a result, it may not always be possible to obtain a highly accurate cross-sectional profile 54 of the processing groove 9.

Accordingly, as described in detail below, the processing unit 38 projects the three-dimensional coordinate data 50 onto the two-dimensional plane 52 and generates the cross-sectional profile 54 in such a manner that the periodic shape of the processing groove 9 is not averaged. In other words, the cross-sectional profile 54 of the processing groove 9 is generated using cross-sectional profiles corresponding to two or more positions of the processing groove 9 formed by the laser of a specific frequency among periodic frequencies. In this case, the processing unit 38 functions as a setting unit 40, a coordinate data acquisition unit 42, and a cross-sectional profile generation unit 44.

Figure 5:
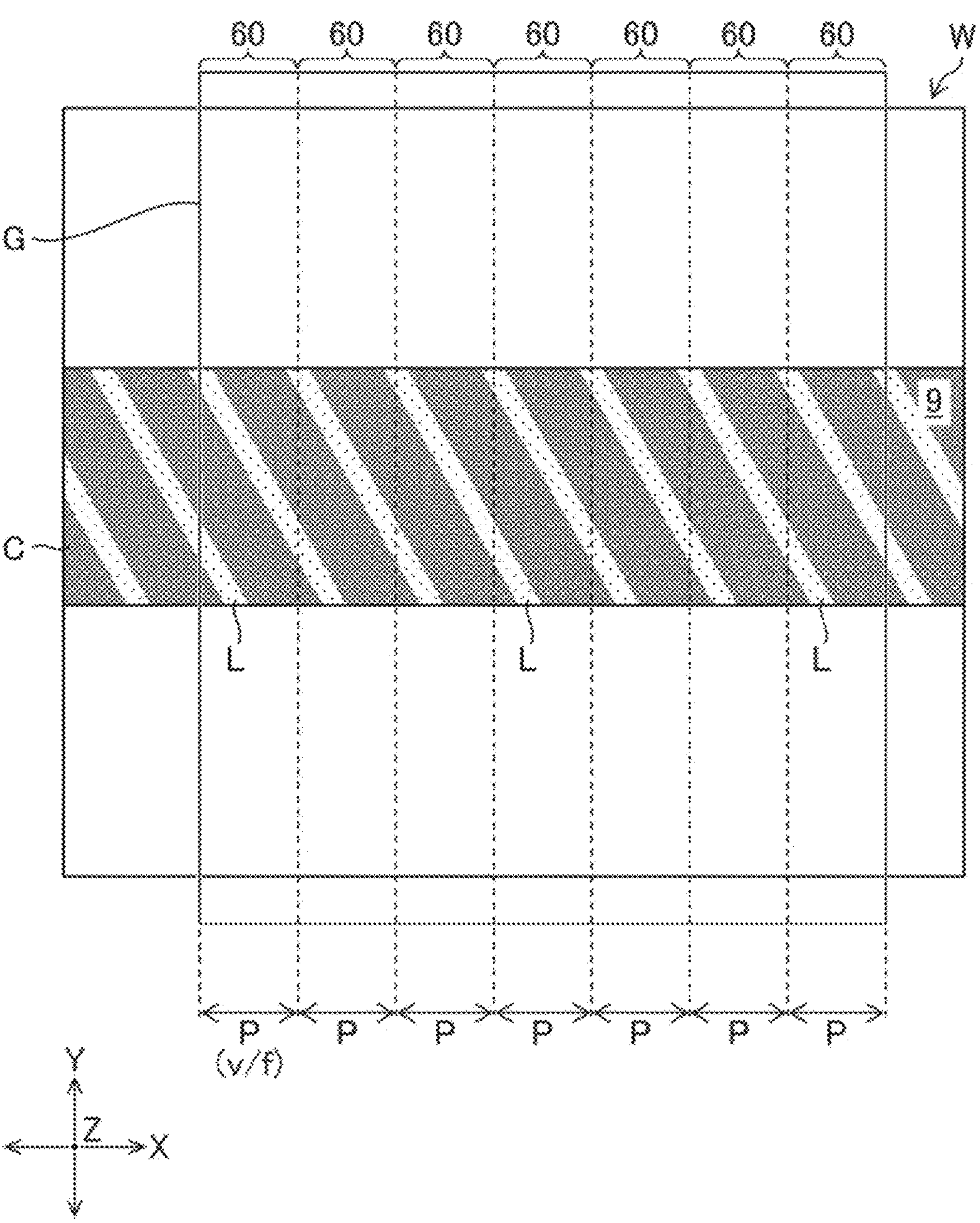
FIG. 5 is an explanatory diagram for describing the processing in which a setting unit divides the processing groove into measurement regions in an X direction.
Figure 6:
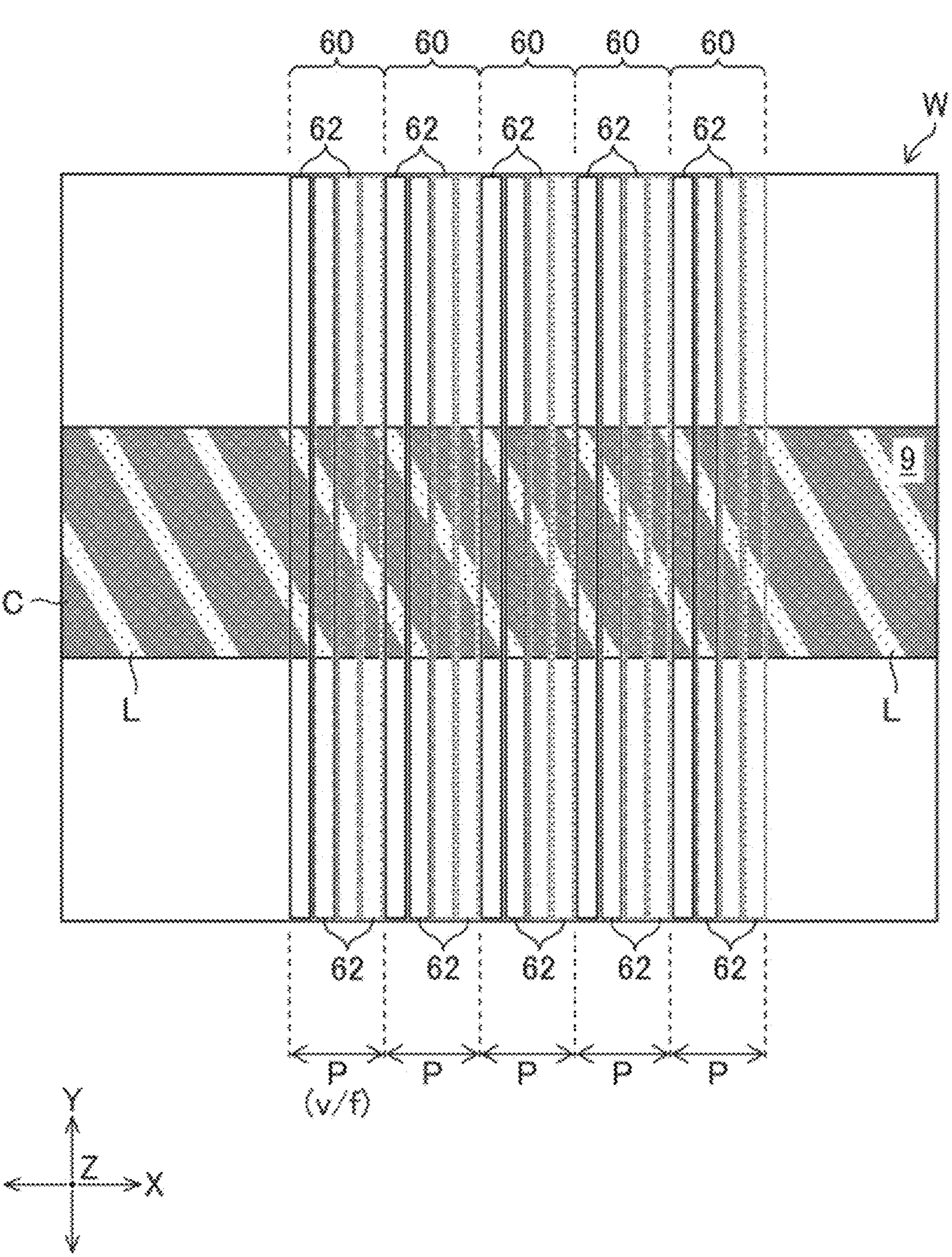
FIG. 6 is an explanatory diagram for describing the processing in which the setting unit sets sub-measurement regions in each of the measurement regions.

FIG. 5 is an explanatory diagram for describing the processing in which the setting unit 40 divides the processing groove 9 into measurement regions 60 in the X direction. In the drawing, reference character G designates the range of shape measurement of the processing groove 9 (an X directional range subjected to computation of the cross-sectional profile 54). FIG. 6 is an explanatory diagram for describing the processing in which the setting unit 40 sets sub-measurement regions 62 in each measurement region 60.

As shown in FIG. 5, the setting unit 40 firstly divides the shape measurement range G of the processing groove 9 with a predetermined pitch P in the X direction. The pitch P is set to match the pulse pitch of v/f (mm) described above. As a result, the shape measurement range G is divided into rectangular (strip shaped) measurement regions 60 along the X direction. The measurement regions 60 each have a width corresponding to the pitch P [P=v/f (mm)] in the X direction.

Next, as shown in FIG. 6, the setting unit 40 sets N number of (N is a natural number of two or more) rectangular (strip shaped) sub-measurement regions 62 in each of the measurement regions 60 in the X direction. FIG. 6 illustrates the case where N number is “4” as an example. In each of the measurement regions 60, a first sub-measurement region 62, a second sub-measurement region 62, . . . an N-th sub-measurement region 62 (here, N=4 in this example) are set in the X direction. Then, when it is assumed that any natural number from 1 to N is M, the M-th sub-measurement region 62 in each of the measurement regions 60 is set at an interval corresponding to the pitch P in the X direction, within the shape measurement range G (see FIG. 7). In each of the measurement regions 60, the first to the N-th sub-measurement regions 62 may be set without gaps therebetween, or may be set with a gap.

Figure 7:
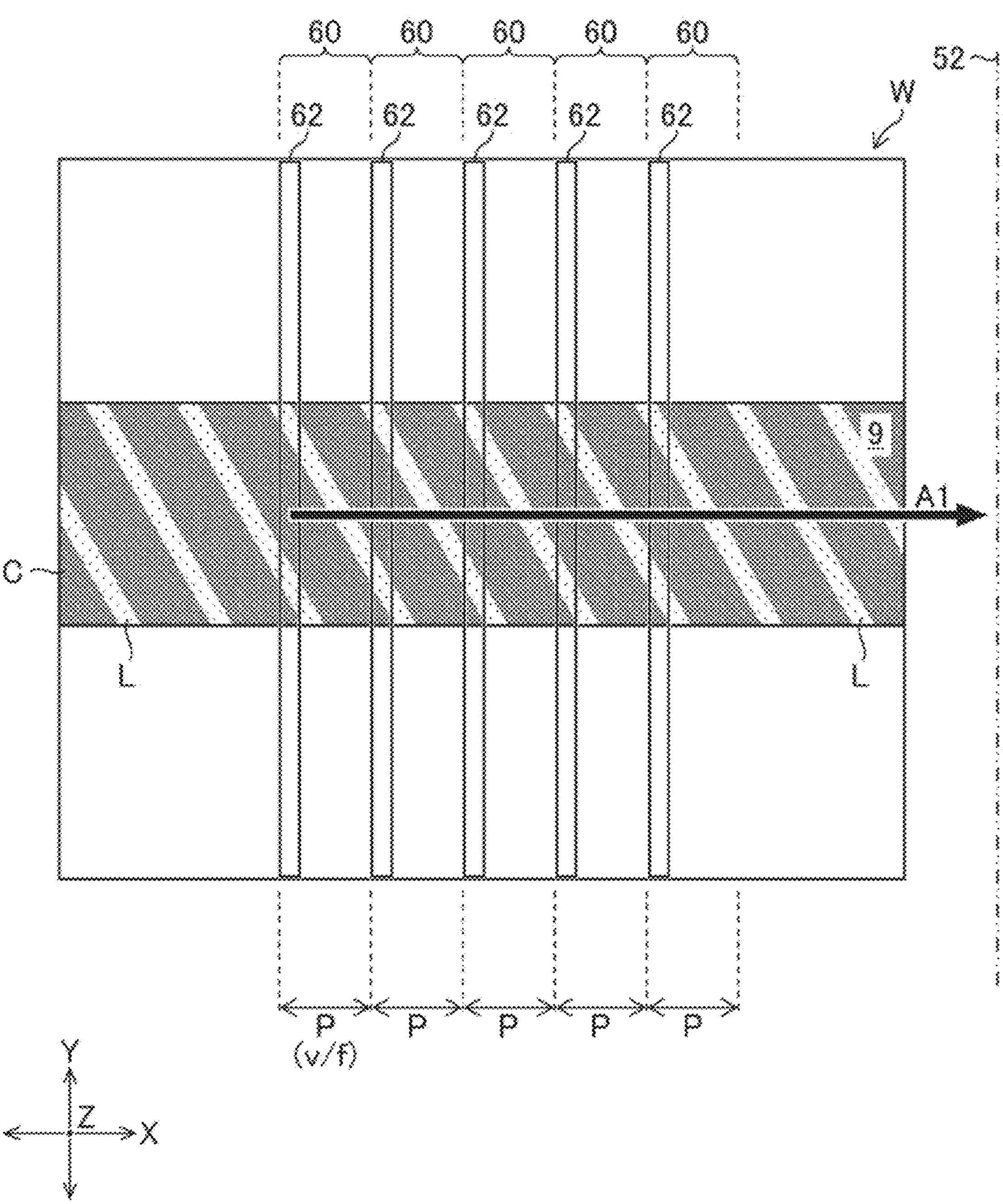
FIG. 7 is an explanatory diagram for describing acquisition of three-dimensional coordinate data by a coordinate data acquisition unit and generation of a cross-sectional profile by a cross-sectional profile generation unit.
Figure 8:
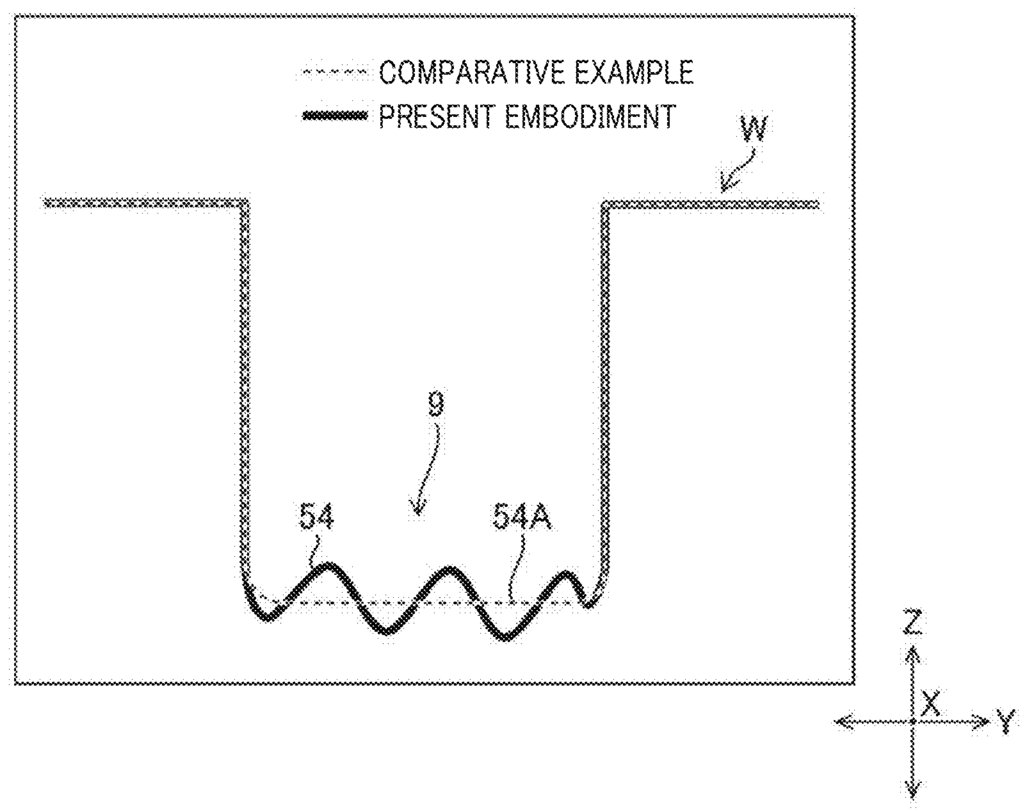
FIG. 8 is a graph showing comparison between a cross-sectional profile generated by the cross-sectional profile generation unit based on the three-dimensional coordinate data corresponding to a first sub-measurement region in each of the measurement regions and a cross-sectional profile generated, as a comparative example, by projecting all the three-dimensional coordinate data within a shape measurement range onto a two-dimensional plane.

FIG. 7 is an explanatory diagram for describing acquisition of the three-dimensional coordinate data 50 by the coordinate data acquisition unit 42 and generation of the cross-sectional profile 54 generated by the cross-sectional profile generation unit 44. FIG. 8 is a graph showing comparison between the cross-sectional profile 54 generated by the cross-sectional profile generation unit 44 based on the three-dimensional coordinate data 50 corresponding to the first sub-measurement region 62 in each of the measurement regions 60 and the cross-sectional profile 54 generated, as a comparative example 54A, by projecting all the three-dimensional coordinate data 50 within the shape measurement range G onto the two-dimensional plane 52.

As shown in FIG. 7 and FIG. 3 described before, the coordinate data acquisition unit 42 acquires the three-dimensional coordinate data 50 corresponding to the M-th sub-measurement region 62, for example, the first sub-measurement region 62, in each of the measurement regions 60 of at least one processing groove 9 (two-dimensional coordinate data is also acceptable when the number of pixels of the sub-measurement regions 62 in the X direction is one) from the data storage unit 36 and outputs the data to the cross-sectional profile generation unit 44.

The cross-sectional profile generation unit 44 projects the three-dimensional coordinate data 50, corresponding to the first sub-measurement regions 62 in the respective measurement regions 60 of at least one processing groove 9 that is firstly input from the coordinate data acquisition unit 42, onto the two-dimensional plane 52 as shown by an arrow A1 in FIG. 7 to generate two-dimensional projection data. Then, as shown in FIG. 8, the cross-sectional profile generation unit 44 applies noise elimination processing or the like to the two-dimensional projection data to generate cross-sectional profile 54 (present embodiment) corresponding to the first sub-measurement region 62 in each of the measurement regions 60 of the at least one processing groove 9.

Thus, in the cross-sectional profile 54 (present embodiment) generated by projecting only the three-dimensional coordinate data 50 corresponding to the first sub-measurement region 62 in each of the measurement regions 60 of at least one processing groove 9 onto the two-dimensional plane 52, the cross-sectional shape of the processing groove 9 is not averaged, unlike the comparative example 54A, which is generated by projecting all the three-dimensional coordinate data 50 in the shape measurement range G onto the two-dimensional plane 52. As a result, the unevenness of the cross-sectional shape of the processing groove 9 can be measured.

Figure 9:
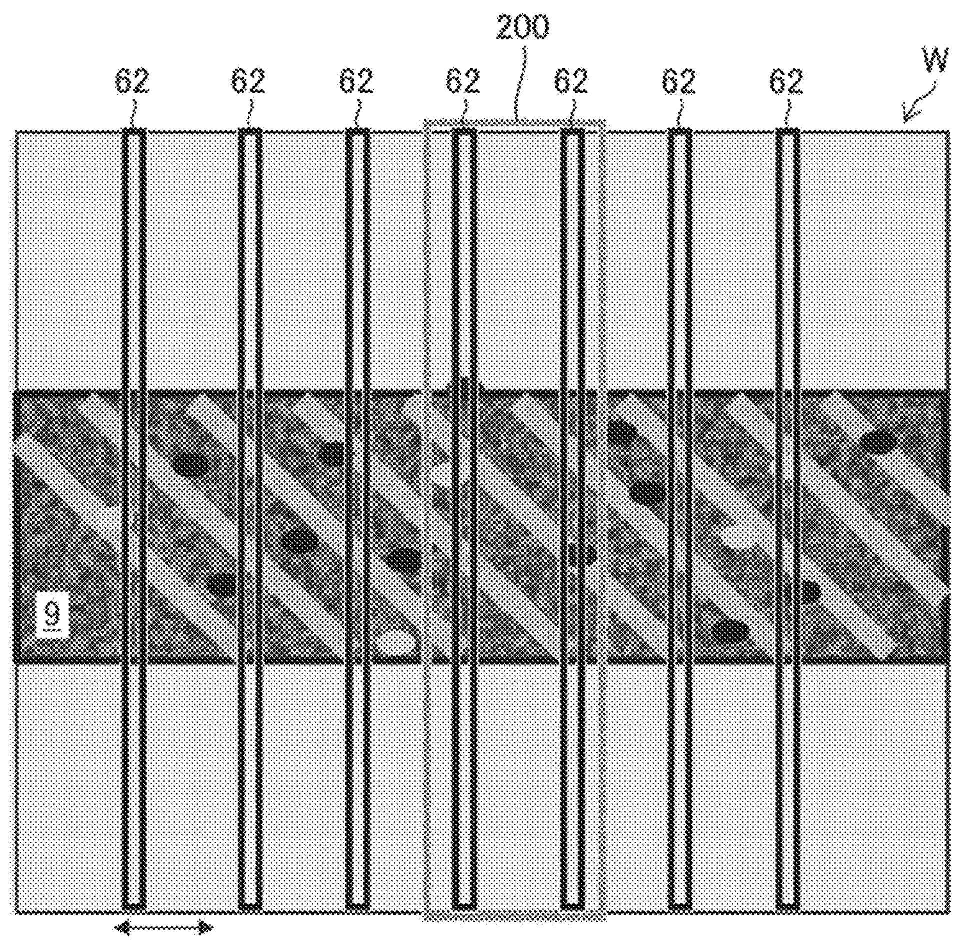
FIG. 9 shows the first sub-measurement region in each of the measurement regions of the processing groove and a stereoscopic region of the processing groove.
Figure 9:
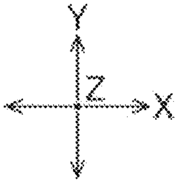
Figure 10:
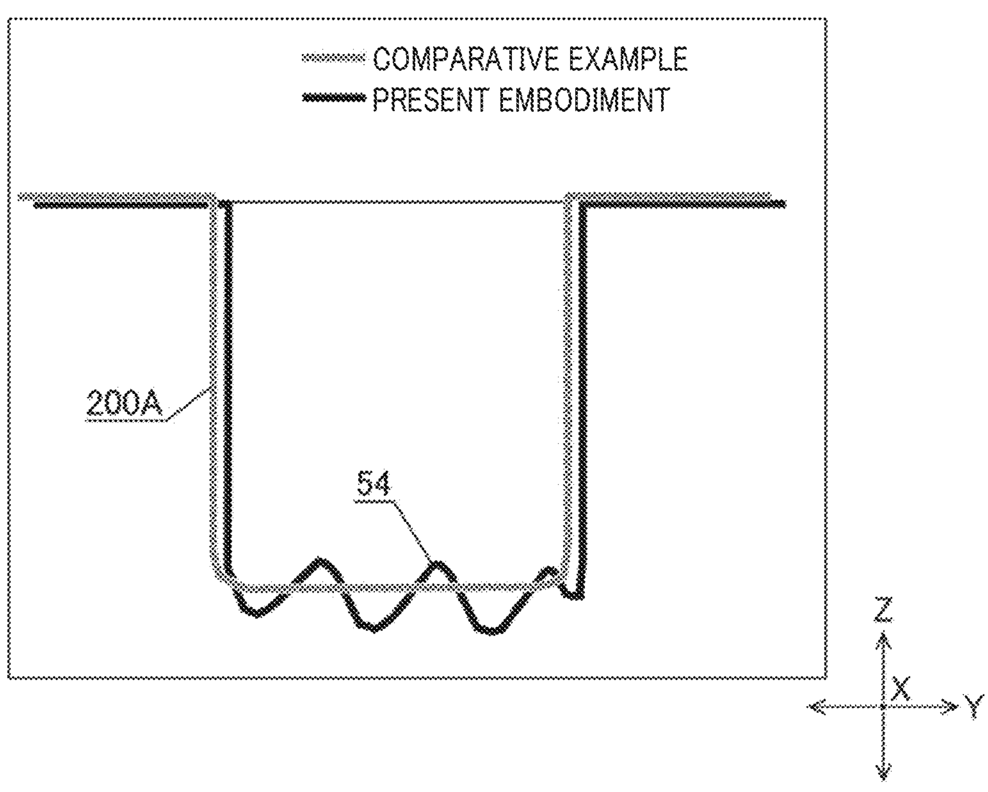
FIG. 10 is a graph showing a cross-sectional profile (the present embodiment) in the first sub-measurement region in FIG. 9 and a cross-sectional profile (comparative example) in the stereoscopic region.
Figure 14:
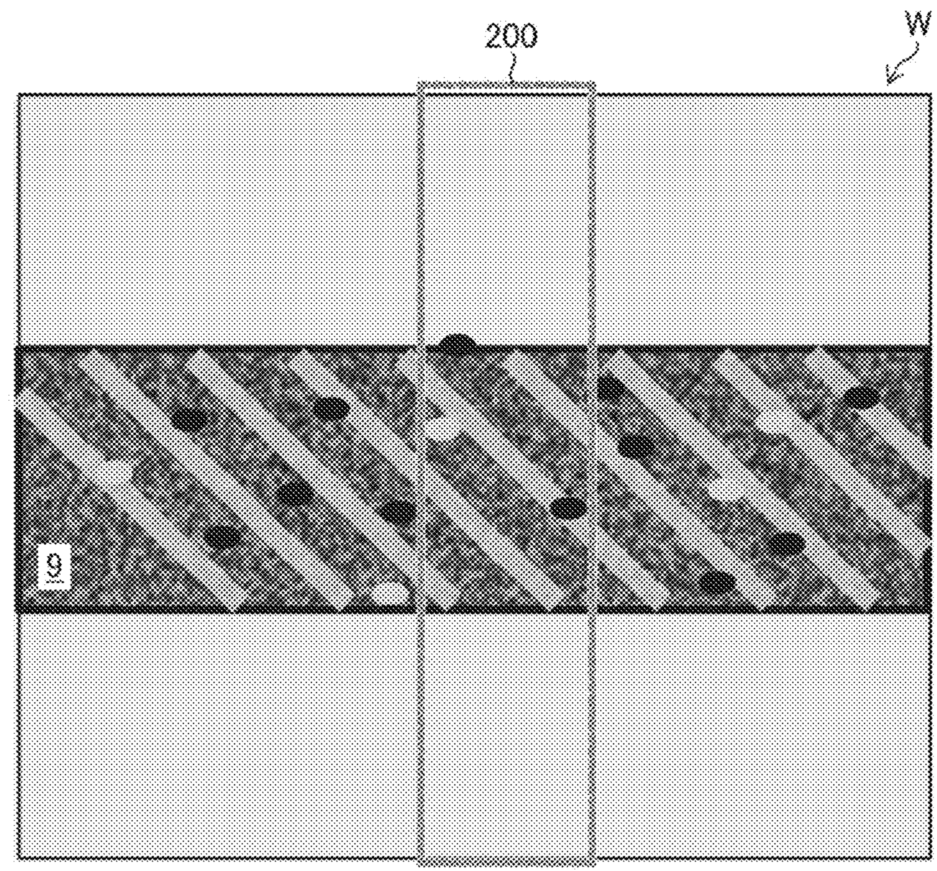
FIG. 14 is an explanatory diagram showing the processing groove after laser processing using pulse laser light as viewed from the top of the workpiece, for describing an issue in the related art.
Figure 14:
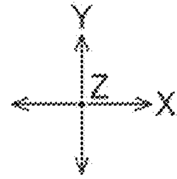
Figure 15:
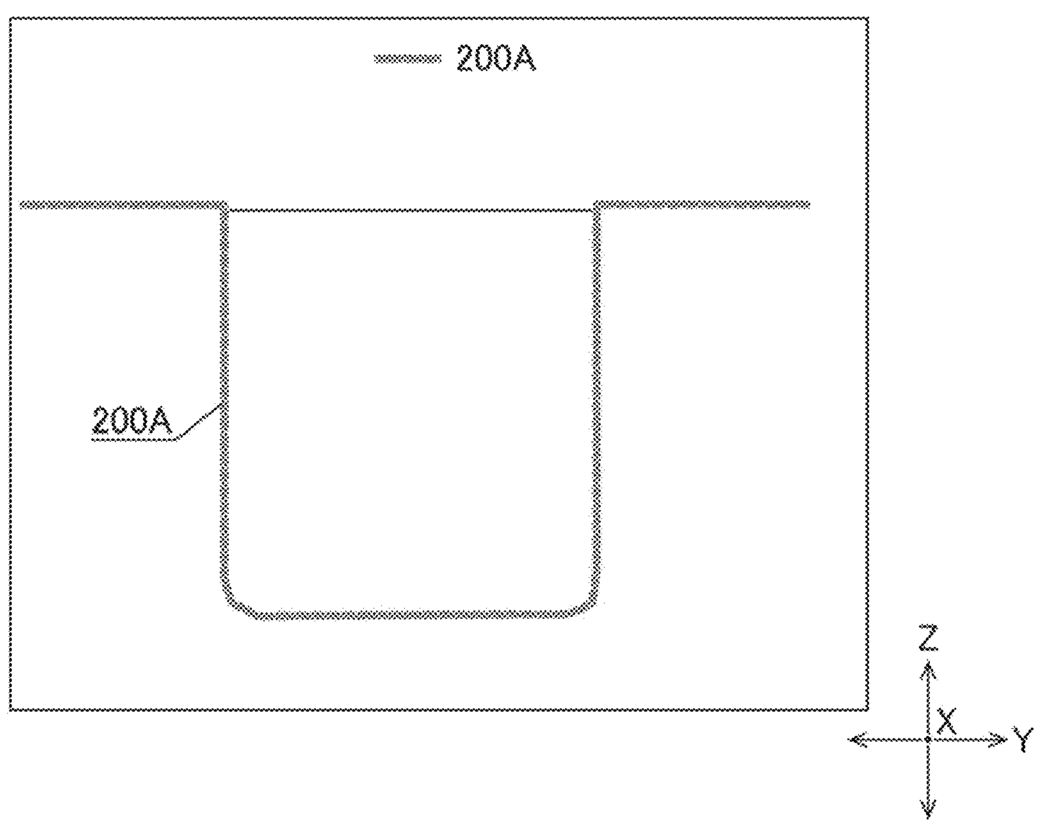
FIG. 15 is a graph showing a cross-sectional profile of the processing groove in a stereoscopic region in FIG. 14.

FIG. 9 shows the first sub-measurement region in each of the measurement regions 60 of the processing groove 9 and the stereoscopic region 200 of the processing groove 9 shown in FIG. 14 described before. FIG. 10 is a graph showing the cross-sectional profile 54 (present embodiment) in the sub-measurement regions 62 in FIG. 9 and the cross-sectional profile 200A (comparative example) in the stereoscopic region 200 shown in FIG. 15 described before.

As shown in FIGS. 9 and 10, in the cross-sectional profile 54 (present embodiment) generated by projecting only the three-dimensional coordinate data 50 corresponding to the first sub-measurement region 62 in each of the measurement regions 60 of at least one processing groove 9 onto the two-dimensional plane 52, the cross-sectional shape of the processing groove 9 is not averaged, unlike the cross-sectional profile 200A (comparative example) which is generated by projecting all the three-dimensional coordinate data 50 in the stereoscopic region 200 onto the two-dimensional plane 52. As a result, a highly accurate cross-sectional profile 54 may be acquired.

In the cross-sectional profile 54 (present embodiment) generated by projecting only the three-dimensional coordinate data 50 corresponding to the first sub-measurement region 62 in each of the measurement regions 60 of at least one processing groove 9 onto the two-dimensional plane 52, non-periodic shape differences due to variation in each pulse of the pulse laser light are averaged, unlike the case where one sub-measurement region is projected on the two-dimensional plane 52 to generate the cross-sectional profile. In other words, it is possible to acquire a cross-sectional profile obtained by averaging the cross-sectional shapes corresponding to two or more positions of the processing groove 9 formed by the laser of a specific frequency.

[Operation of Present Embodiment]

Figure 11:
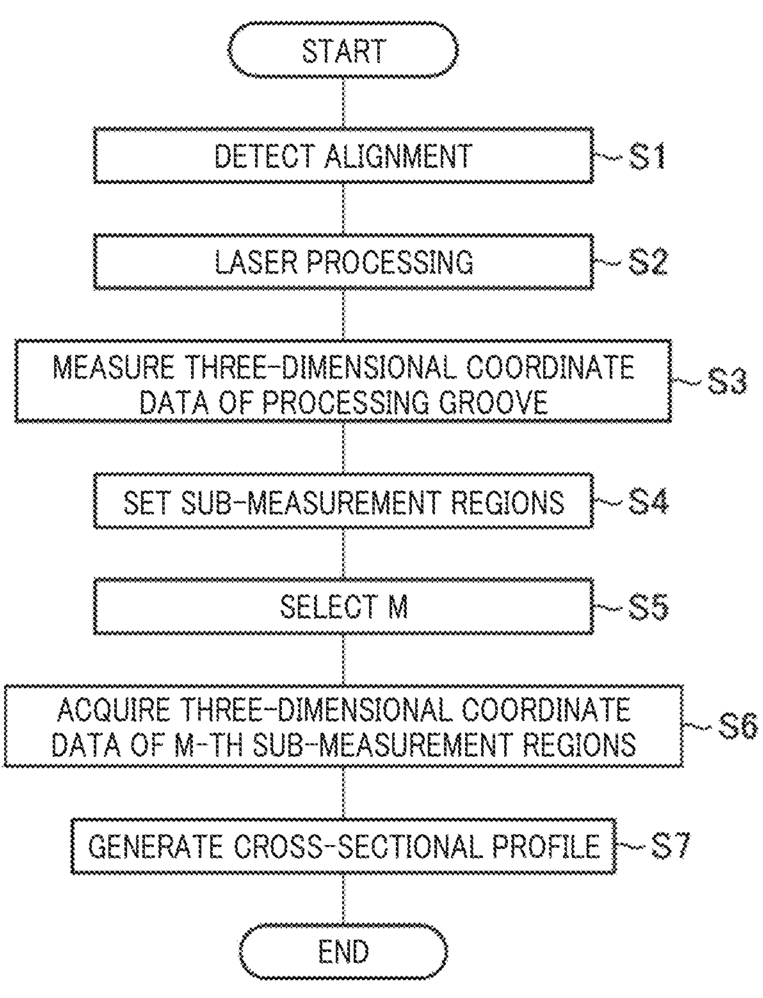
FIG. 11 is a flowchart showing the flow of shape measurement processing of the processing groove after laser processing by the laser processing apparatus.
Figure 12:
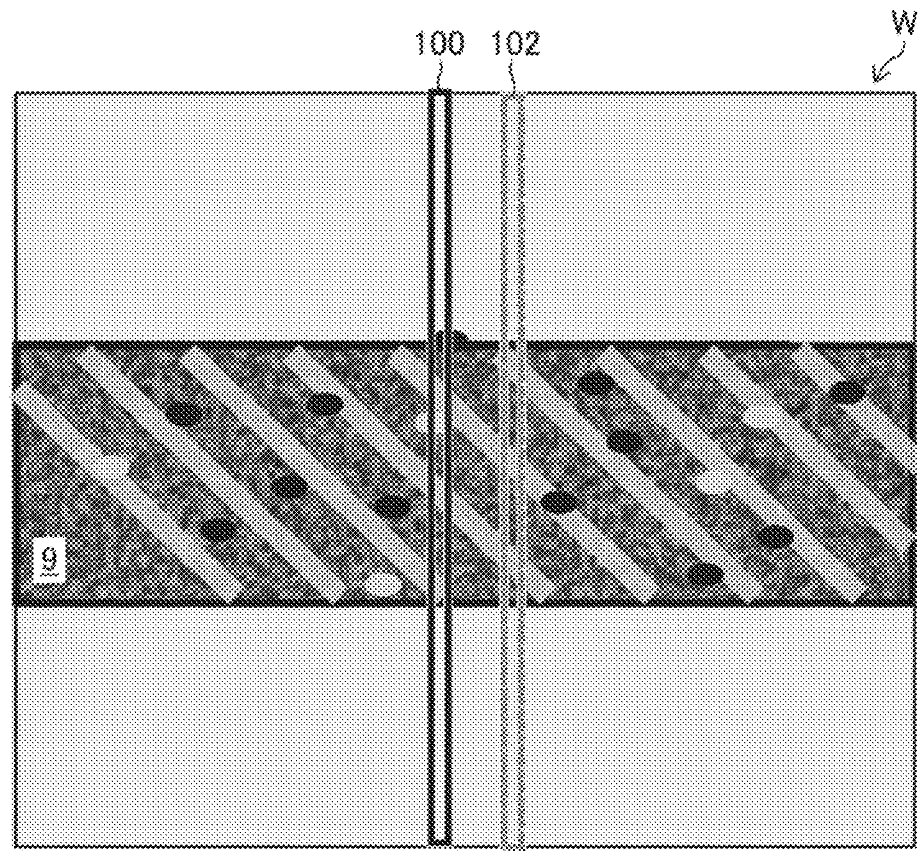
FIG. 12 is an explanatory diagram showing the processing groove after laser processing using pulse laser light as viewed from the top of a workpiece, for describing an issue in the related art.
Figure 12:
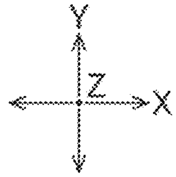
Figure 13:
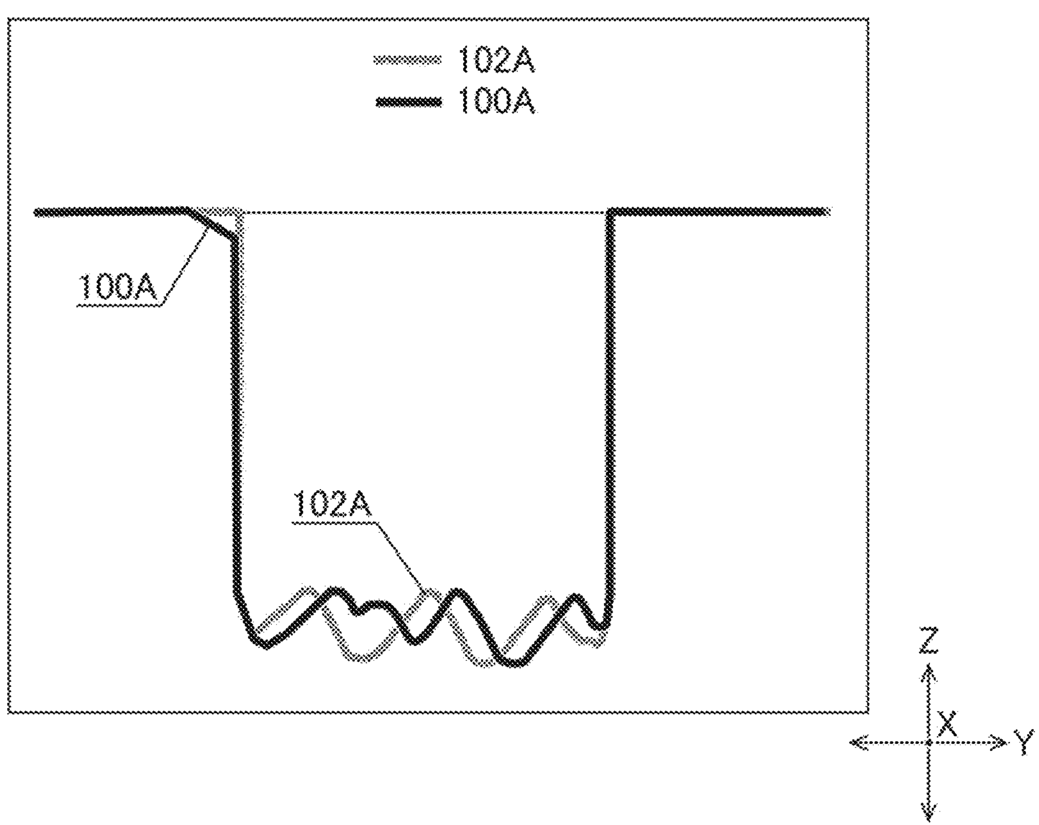
FIG. 13 is a graph showing a cross-sectional profile of the processing groove in a region 100 in FIG. 12 and a cross-sectional profile of the processing groove in a region 102.

FIG. 11 is a flowchart showing the flow of shape measurement processing for the processing groove 9 according to the groove shape measuring method of the present disclosure, after laser processing by the laser processing apparatus 10.

As shown in FIG. 11, when the workpiece W to be processed is sucked and held by the suction stage 12, the alignment control unit 30 of the control device 18 is activated. The alignment control unit 30 controls the stage drive unit 14 and the alignment microscope 22 to acquire a captured image data on the alignment reference of the workpiece W. The alignment control unit 30 analyzes the captured image data and performs alignment detection to detect the position of each street C of the workpiece W (step S1).

When alignment detection is completed, the processing control unit 32 is activated to start laser processing for the street C. The processing control unit 32 firstly drives the stage drive unit 14 to perform alignment to align the optical axis of the laser optical system 20 with the processing start position of a first street C, based on the result of alignment detection by the alignment control unit 30. Once the alignment is completed, the processing control unit 32 controls the laser optical system 20 to concentrate the pulse laser light L with frequency f (Hz) to the street C on the surface of the workpiece W. Thus, starts laser processing is started to form at least one processing groove 9 on at least one street C (step S2).

Next, the processing control unit 32 drives the stage drive unit 14 to move the suction stage 12 in the X direction at the processing feed speed [v (mm/sec)], and thereby moves the processing head 16 relatively to the workpiece W in the X direction. As a result, the processing groove 9 is formed along the first street C on the surface of the workpiece W. Then, formation of the processing groove 9 (laser processing) along the remaining streets C is repeatedly performed in a similar manner.

After laser processing of the workpiece W is completed (or in the middle of later processing), the measurement control unit 34 is activated to start measurement of the three-dimensional coordinate data 50 on the processing groove 9 using the white interference microscope 24. Firstly, the measurement control unit 34 drives the stage drive unit 14 to set the white interference microscope 24 above the shape measurement range G of the processing groove 9 in the Z direction.

Then, while causing the white interference microscope 24 to scan in the Z direction by controlling the unillustrated Z carriage, the measurement control unit 34 repeatedly performs irradiation of the processing groove 9 with white light using the white interference microscope 24 and imaging of interference light using a two-dimensional imaging element of the white interference microscope 24. Based on an imaging signal of the interference light output from the white interference microscope 24 and Z position information on the white interference microscope 24 output from the unillustrated Z carriage, the measurement control unit 34 measures the three-dimensional coordinate data 50 in the shape measurement range G of the processing groove 9 by a publicly known method (step S3, corresponding to the coordinate data measurement step of the present invention). The measurement control unit 34 then stores the three-dimensional coordinate data 50 in the data storage unit 36.

Here, in a case where the shape measurement range G of the processing groove 9 is wider than the measurable range of the white interference microscope 24, the position of white interference microscope 24 with respective to the workpiece W is relatively changed in the X-direction, and then scanning by the white interference microscope 24 in the Z direction, and irradiation of white light and imaging of the interference light by the white interference microscope 24 are repeatedly performed.

After the measurement of the three-dimensional coordinate data 50 is completed, the setting unit 40 divides the shape measurement range G of at least one processing groove 9 in the X direction with a predetermined pitch P [P=v/f (mm)] as shown in FIG. 5 described before. Then, the setting unit 40 sets N numbers of sub-measurement regions 62 in each of the measurement regions 60 of at least one processing groove 9, along the X direction (step S4, corresponding to the setting step of the present invention) as shown in FIG. 6 described before.

After setting of the respective sub-measurement regions 62 is completed, the coordinate data acquisition unit 42 selects and acquires the three-dimensional coordinate data 50 corresponding to the M-th sub-measurement region 62, for example, the first (M=1) sub-measurement region 62, in each of the measurement regions 60 of at least one processing groove 9 from the data storage unit 36, and outputs the data to the cross-sectional profile generation unit 44 (steps S5 and S6, corresponding to the coordinate data acquisition step of the present invention).

Then, the cross-sectional profile generation unit 44 projects the three-dimensional coordinate data 50 corresponding to the first sub-measurement region 62 in each of the measurement regions 60 of at least one processing groove 9, which is input from the coordinate data acquisition unit 42, onto the two-dimensional plane 52 as shown in FIG. 7 described before. As a result, only the three-dimensional coordinate data 50, corresponding to the first sub-measurement regions 62 in the respective measurement regions 60 which are set in the shape measurement range G of at least one processing groove 9 at an interval corresponding to (equivalent to) an integer multiple of the pitch P, is projected onto the two-dimensional plane 52. After the projection, the cross-sectional profile generation unit 44 generates the cross-sectional profile 54 corresponding to the first sub-measurement regions 62 in the respective measurement regions 60 of at least one processing groove 9 (step S7, corresponding to the cross-sectional profile generation step) as shown in FIG. 8 described before.

As described in the foregoing, the laser processing apparatus 10 according to the present embodiment generates the cross-sectional profile 54 by projecting the three-dimensional coordinate data 50 corresponding to specific sub-measurement regions 62 in the respective measurement regions 60 of at least one processing groove 9 onto the two-dimensional plane 52. Thus, it is possible to prevent the periodic shape of the processing groove 9 in the X direction from being averaged, so that a highly accurate cross-sectional profile 54 of the processing groove 9 may be obtained. In addition, in the laser processing apparatus 10 according to the present embodiment, there is no need to generate three-dimensional coordinate data of the processing groove 9 and cut out a cross section from the three-dimensional data as in conventional art. Thus, the processing load of the control device 18 is reduced and the measurement speed of the cross-sectional profile 54 is improved. As a result, the laser processing apparatus 10 achieves reduction in processing load and acquisition of a highly accurate cross-sectional profile 54 of the processing groove 9.

Here, based on each cross-sectional profile 54 generated by the laser processing apparatus 10, various evaluations may be performed, such as determination of the quality of processing groove 9, detection of debris, and detection of the amount of displacement in the processing position of the processing groove 9, so as to correct laser processing (feet back control) or the like based on the evaluation results. For example, a maximum peak-to-peak value of the roughness of the bottom surface of the processing groove 9 is obtained for each of the cross-sectional profile 54, the highest value among the maximum values of the roughness of the respective cross-sectional profiles 54 is determined as a value representing the roughness of the bottom surface of the processing groove 9, and feedback control is performed based on the determined value.

[Others]

In the above embodiment, the setting unit 40 divides the shape measurement range G of the processing groove 9 along the X direction with a pitch P [P=v/f (mm)]. However, for example, the shape measurement range G may be divided along the X direction with a pitch P that is an integer multiple of v/f (mm), and N number of sub-measurement regions 62 may be set for each measurement region 60 divided with the pitch P (mm). In addition, in the case of dividing the shape measurement range G of the processing groove 9 in the X direction, the pitch P is not necessarily limited to v/f (mm) [including integer multiples of v/f (mm)], and may be a value near v/f (mm), or may be any value.

In the above embodiment, the three-dimensional coordinate data 50 corresponding to the M-th sub-measurement regions 62 in each of the measurement regions 60, is projected onto the two-dimensional plane 52 perpendicular to the X direction, however, the two-dimensional plane 52 may be substantially perpendicular to the X direction. At the intersections of lattice-shaped streets C, the cross-sectional profile 54 of the processing groove 9 parallel to the X direction and the cross-sectional profile 54 of the processing groove 9 parallel to the Y direction may be measured simultaneously. In this case, the three-dimensional coordinate data 50 corresponding to the M-th sub-measurement regions 62 in the respective measurement regions 60, is projected onto the two-dimensional plane 52 perpendicular to the longitudinal direction (the X direction or Y direction) of the processing groove 9.

For example, acquisition of the three-dimensional coordinate data 50 and generation of the cross-sectional profile 54, corresponding to the M-th sub-measurement region 62 in each of the measurement regions 60, may be performed only once. Alternatively, acquisition of the three-dimensional coordinate data 50 and generation of the cross-sectional profile 54, corresponding to the sub-measurement regions 62 of predetermined numbers (for example, even numbers, odd numbers or the like) within the first to the N-th sub-measurement regions 62 in each of the measurement regions 60, may repeatedly be performed.

In the above embodiment, the case of measuring the cross-sectional profile 54 of the processing groove 9 formed by laser processing using the laser processing apparatus 10 has been described as an example. However, the present disclosure is also applicable to the measurement of the cross-sectional profile 54 of the processing groove 9 formed by a blade dicer (processing apparatus) that performs cutting processing on the streets C of the workpiece W using a blade.

REFERENCE SIGNS LIST

9 . . . processing groove, 10 . . . laser processing apparatus, 12 . . . suction stage, 14 . . . stage drive unit, 16 . . . processing head, 18 . . . control device, 20 . . . laser optical system, 22 . . . alignment microscope, 24 . . . white interference microscope, 30 . . . alignment control unit, 32 . . . processing control unit, 34 . . . measurement control unit, 36 . . . data storage unit, 38 . . . processing unit, 40 . . . setting unit, 42 . . . coordinate data acquisition unit, 44 . . . cross-sectional profile generation unit, 50 . . . three-dimensional coordinate data, 52 . . . two-dimensional plane, 54 . . . cross-sectional profile, 60 . . . measurement region, 62 . . . sub-measurement region, C . . . street, CP1 . . . cut-out position, CP2 . . . cut-out position, G . . . shape measurement range, L . . . pulse laser light, W . . . workpiece

What is claimed is:

1. A groove shape measuring method for measuring a shape of a processing groove formed on a workpiece by a processing apparatus, the groove shape measuring method comprising:

a setting step of dividing the processing groove into measurement regions with a predetermined pitch along a longitudinal direction of the processing groove and further setting N number of sub-measurement regions along the longitudinal direction in each of the measurement regions, wherein N is a natural number of two or more;

a coordinate data acquisition step of acquiring coordinate data representing the shape of the processing groove in M-th sub-measurement regions in the respective measurement regions, wherein M is any natural number from 1 to N;

a cross-sectional profile generation step of generating a cross-sectional profile of the processing groove by projecting coordinate data corresponding to the M-th sub-measurement regions acquired in the coordinate data acquisition step, onto a two-dimensional plane; and a coordinate data measurement step of measuring the coordinate data on the processing groove, wherein in the coordinate data acquisition step, the coordinate data corresponding to the M-th sub-measurement regions in the respective measurement regions are acquired from the coordinate data previously measured in the coordinate data measurement step.

2. The groove shape measuring method according to claim 1, wherein in the setting step, an interval between the M-th sub-measurement regions in the respective measurement regions is set to the pitch.

3. The groove shape measuring method according to claim 2, wherein in a case where the processing groove is formed by pulse laser light emitted to the workpiece, from the processing apparatus that is moved relatively to the workpiece at predetermined processing feed speed, in the setting step, the pitch is set according to P=v/f (mm) or an integer multiple of v/f (mm), wherein v (mm/sec) represents the processing feed speed, f (Hz) represents frequency of the pulse laser light and P represents the pitch.

4. The groove shape measuring method according to claim 1, wherein in the cross-sectional profile generation step, the coordinate data corresponding to the M-th sub-measurement regions are projected onto the two-dimensional plane perpendicular to the longitudinal direction.

5. A groove shape measuring apparatus that measures a shape of a processing groove formed on a workpiece by a processing apparatus, the groove shape measuring apparatus comprising:

a setting unit configured to divide the processing groove into measurement regions with a predetermined pitch along a longitudinal direction of the processing groove, and further sets N number of sub-measurement regions in each of the measurement regions along the longitudinal direction, wherein N is a natural number of two or more;

a coordinate data acquisition configured to acquire coordinate data representing the shape of the processing groove in M-th sub-measurement regions in the respective measurement regions, wherein M is any natural number from 1 to N;

a cross-sectional profile generation unit configured to generate a cross-sectional profile of the processing groove by projecting the coordinate data corresponding to the M-th sub-measurement regions acquired for the respective measurement regions by the coordinate data acquisition unit, onto a two-dimensional plane; and a measurement control unit configured to measure the coordinate data on the processing groove, wherein the coordinate data corresponding to the M-th sub-measurement regions in the respective measurement regions are acquired from the coordinate data that was previously measured.

6. The groove shape measuring apparatus according to claim 5, wherein in a case where the processing groove is formed by pulse laser light emitted from the processing apparatus that is moved relatively to the workpiece at predetermined processing feed speed, the setting unit sets the pitch to P=v/f (mm) or an integer multiple of v/f (mm), wherein v (mm/sec) represents the processing feed speed, f (Hz) represents frequency of the pulse laser light, and P represents the pitch.

* * * * *